United States Patent
Kollia et al.

(10) Patent No.: US 10,878,336 B2
(45) Date of Patent: Dec. 29, 2020

(54) TECHNOLOGIES FOR DETECTION OF MINORITY EVENTS

(71) Applicants: Varvara Kollia, Santa Clara, CA (US); Ramune Nagisetty, Portland, OR (US)

(72) Inventors: Varvara Kollia, Santa Clara, CA (US); Ramune Nagisetty, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1031 days.

(21) Appl. No.: 15/192,413

(22) Filed: Jun. 24, 2016

(65) Prior Publication Data
US 2017/0372222 A1    Dec. 28, 2017

(51) Int. Cl.
*G06N 20/00* (2019.01)
*G06F 16/901* (2019.01)
*G06N 5/00* (2006.01)

(52) U.S. Cl.
CPC ......... *G06N 20/00* (2019.01); *G06F 16/9027* (2019.01); *G06N 5/003* (2013.01)

(58) Field of Classification Search
CPC .... G06N 20/00; G06N 5/003; G06F 16/9027; G06F 17/30598
See application file for complete search history.

(56) References Cited

U.S. PATENT DOCUMENTS

| | | | |
|---|---|---|---|
| 5,657,424 A * | 8/1997 | Farrell | G10L 15/05 704/232 |
| 7,650,331 B1 | 1/2010 | Dean et al. | |
| 8,386,574 B2 * | 2/2013 | Chidlovskii | G06K 9/6284 709/206 |
| 8,418,249 B1 * | 4/2013 | Nucci | G06F 21/552 706/20 |
| 8,914,319 B2 * | 12/2014 | Syed | G06F 19/00 706/46 |
| 8,990,135 B2 * | 3/2015 | Syed | G06N 20/00 706/45 |
| 9,165,051 B2 * | 10/2015 | Masud | G06F 16/285 |

(Continued)

OTHER PUBLICATIONS

Celine Vens, "Decision trees for hierarchical multi-label classification", Published online: Aug. 1, 2008, Springer Science+Business Media, LLC 2008, 185-214 (Year: 2008).*

(Continued)

*Primary Examiner* — Vincent Gonzalez
*Assistant Examiner* — Imad Kassim
(74) *Attorney, Agent, or Firm* — Hanley, Flight & Zimmerman, LLC (57) ABSTRACT

Technologies for detecting minority events are disclosed. By performing a guided hierarchical classification algorithm with a decision tree structure and grouping the minority class(es) in with some of the majority classes, large majority classes may be separated from a minority class without requiring good detection of the minority events by themselves. The decision tree structure may be used only for the purpose of identifying if the data sample in question is a member of a minority class. If it is determined that it is not, a primary classification algorithm may be used. With this approach, the guided hierarchical classification algorithm need not perform as well as the primary classification algorithm for the majority events, but may provide improved detection for minority events.

22 Claims, 5 Drawing Sheets

(56) References Cited

U.S. PATENT DOCUMENTS

| | | | | |
|---|---|---|---|---|
| 2012/0036094 | A1* | 2/2012 | Takeguchi | G06T 7/0012 |
| | | | | 706/12 |
| 2013/0006676 | A1* | 1/2013 | Helitzer | G06Q 40/08 |
| | | | | 705/4 |
| 2013/0251192 | A1* | 9/2013 | Tu | G06K 9/00375 |
| | | | | 382/103 |
| 2014/0247977 | A1* | 9/2014 | Han | G06K 9/34 |
| | | | | 382/159 |
| 2016/0012352 | A1* | 1/2016 | Peng | G06N 20/00 |
| | | | | 706/12 |
| 2016/0321561 | A1* | 11/2016 | Roder | G06N 20/00 |
| 2018/0101788 | A1* | 4/2018 | He | G06F 17/18 |

OTHER PUBLICATIONS

H. He and E. A. Garcia, "Learning from Imbalanced Data," IEEE Trans. Knowledge and Data Engineering, vol. 21, issue 9, pp. 1263-1284 (2009).

N. Chawla, A. Lazarevic, L. Hall, and K. Bowyer, "SMOTEBoost: improving prediction of the minority class in boosting," 7th European Conf. on Principles and Practice of Knowledge Discovery in Databases, Dubrovnik, Croatia, pp. 107-119 (2003).

M. Galar, A. Fernandez, E. Barrenechea, H. Bustince, and F. Herrera, A review on ensembles for the class imbalance problem: bagging-, boosting-, and hybrid-based approaches, IEEE Trans. on Systems, Man, and Cybernetics, Part C: Applications and Reviews, vol. 42, issue 4, pp. 463-483 (2012).

V. Lopez, A. Fernandez, S. Garcia, V. Palade, and F. Herrera, "An insight into classification with imbalanced data: Empirical results and current trends on using data intrinsic characteristics," Information Sciences, vol. 250, pp. 113-141 (2013).

Triguero et al., "ROSEFW-RF: The winner algorithm for the ECBDL '14 big data competition: An extremely imbalanced big data bioinformatics problem," Knowledge Based Systems, pp. 69-79 (2015).

L. Gonzalez-Abril, H. Nunez, C. Angulo, and F. Velasco, "GSVM: An SVM for handling imbalanced accuracy between classes in bi-classification problems," Applied Soft Computing, vol. 17, pp. 23-31 (2014).

C. Wu, Y. Guo, Y. Ma, "Adaptive Anomalies Detection with Deep Network," Cognitive 2015: The 7th Int. Conf. on Adv. Cognitive Technologies and Applications, Nice, France, pp. 181-186 (2015).

L. Breiman, "Random Forests," Article Machine Learning, Kluwer Academic Publishers, vol. 45, issue 1, pp. 5-32 (2001).

C. Chen, A. Liaw, L. Breiman, "Using Random Forests to Learn Imbalanced Data," Technical Report, Department of Statistics, UC Berkeley (2004). Retrieved from <http://statistics.berkeley.edu/sites/default/files/tech-reports/666.pdf> on Jun. 14, 2016.

* cited by examiner

TECHNOLOGIES FOR DETECTION OF MINORITY EVENTS

BACKGROUND

Machine learning, including classification of sensor data such as images, sound, or other sensor data, is useful in a wide variety of areas, including object detection, diagnosis of a medical condition, and detection of security conditions such as breach of a network. Several approaches to data classification have been developed that work well in many situations, such as support vector machines, artificial neural networks, random forests, etc.

One important feature of a classification algorithm is its ability to detect rare events. In some cases, such as in diagnosing a medical condition, rare events (or minority events) may not occur very often, but misclassifying them may come at a significant cost. However, standard approaches to data classification may not handle minority events as well as may be desired.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
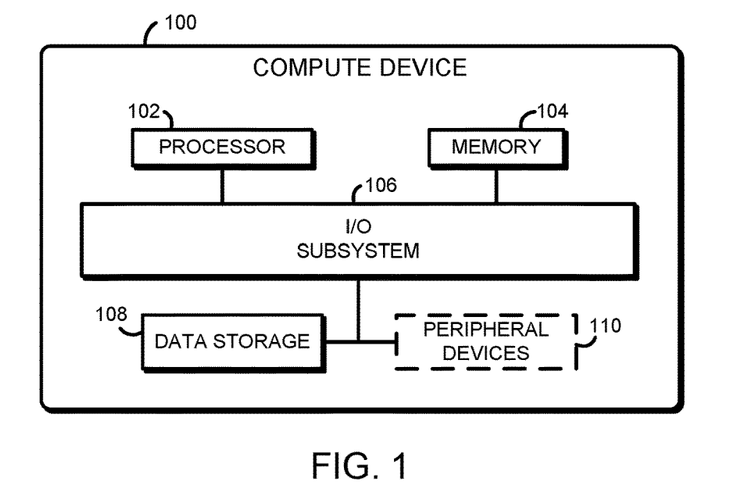
FIG. 1 is a simplified block diagram of at least one embodiment of a compute device that may be used for detecting a minority event.

Referring now to FIG. 1, an illustrative compute device 100 is configured to detect minority events in data samples. That is, the compute device 100 is configured to identify and, in some cases, respond to events indicated by a data sample or samples that occurs infrequently or is otherwise unexpected. To do so, the compute device 100 trains a guided hierarchical classification algorithm for detection of the particular minority events and performs the guided hierarchical classification algorithm to detect those minority events. The guided hierarchical classification algorithm employs a decision tree structure. As described in more detail below, the illustrative compute device 100 may acquire training data including labeled data samples belonging to one of several classes, including a minority class. As part of training the guided hierarchical classification algorithm to detect minority events, the compute device 100 begins with all of the classes present at the starting node of the decision tree structure. The compute device 100 then distributes the classes of the data samples into two child nodes with approximately the same number of data samples in each child node, and trains a classification algorithm to classify the data samples into one of the two child nodes. The compute device 100 then determines which child node the minority class is included in, and further splits the classes in that node into two new child nodes, and again trains a classification algorithm to classify the data samples into the two new child nodes. The compute device 100 iteratively repeats this process, until the minority class is isolated in a node by itself. The compute device 100 may separately train a primary classification algorithm (such as a random forest) to classify all of the data samples of the training data.

After the classification algorithms have been trained, the compute device 100 may classify an input data sample. To do so, the compute device 100 first executes the guided hierarchical classification algorithm to determine if the input data sample is a member of the minority class. If it is, classification is complete. If it is not, the compute device 100 may execute the primary algorithm to determine which majority class the input data sample is a member of. After classifying the input data sample, the compute device 100 may perform an action based on the classification, such as by presenting a result to a user of the compute device 100.

The compute device 100 may be embodied as any type of compute device capable of performing the functions described herein. For example, the compute device 100 may be embodied as or otherwise be included in, without limitation, a server computer, a desktop computer, an embedded computing system, a System-on-a-Chip (SoC), a tablet computer, a notebook computer, a laptop computer, a smartphone, a cellular phone, a wearable computer, a handset, a messaging device, a camera device, a multiprocessor system, a processor-based system, a consumer electronic device, and/or any other computing device. The illustrative compute device 100 includes a processor 102, a memory 104, an input/output (I/O) subsystem 106, and data storage 108. In some embodiments, one or more of the illustrative components of the compute device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100 on a single integrated circuit chip.

The data storage 108 may be embodied as any type of device or devices configured for the short-term or long-term storage of data. For example, the data storage 108 may include any one or more memory devices and circuits, memory cards, hard disk drives, solid-state drives, or other data storage devices.

In some embodiments, the compute device 100 may include other or additional components, such as those commonly found in a compute device. For example, the compute device 100 may also have peripheral devices 110. The peripheral devices 110 may include a keyboard, a mouse, a display, a communication circuit, etc.

Figure 2:
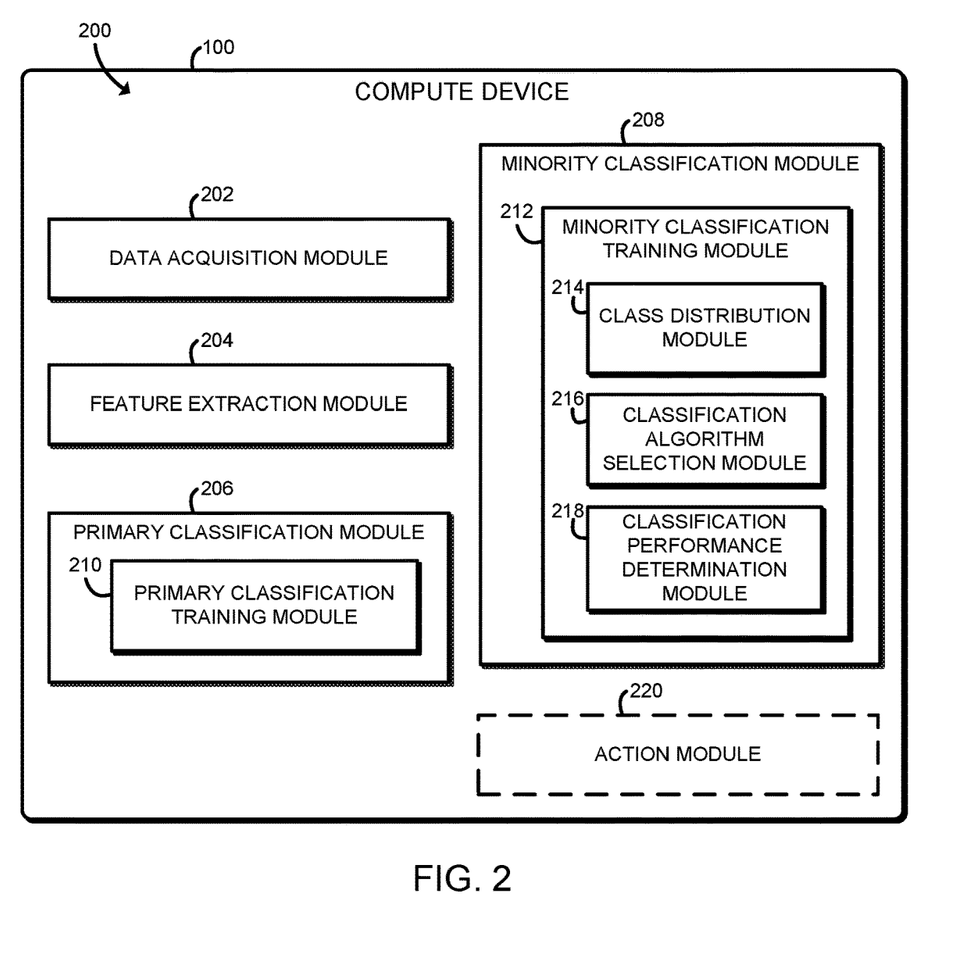
FIG. 2 is a block diagram of at least one embodiment of an environment that may be established by the compute device of FIG. 1.

Referring now to FIG. 2, in use, the compute device 100 may establish an environment 200. The illustrative environment 200 includes a data acquisition module 202, a feature extraction module 204, a primary classification module 206, and a minority classification module 208. The various modules of the environment 200 may be embodied as hardware, software, firmware, or a combination thereof. For example, the various modules, logic, and other components of the environment 200 may form a portion of, or otherwise be established by, the processor 102 or other hardware components of the compute device 100. As such, in some embodiments, one or more of the modules of the environment 200 may be embodied as circuitry or collection of electrical devices (e.g., a data acquisition circuit 202, a feature extraction circuit 204, a primary classification circuit 206, etc.). It should be appreciated that, in such embodiments, one or more of the circuits (e.g., the data acquisition circuit 202, the feature extraction circuit 204, the primary classification circuit 206, etc.) may form a portion of one or more of the processor 102, the memory 104, the I/O subsystem 106, and/or the data storage 108. Additionally, in some embodiments, one or more of the illustrative modules may form a portion of another module and/or one or more of the illustrative modules may be independent of one another.

The data acquisition module 202 is configured to acquire training data, test data, and input data. The data acquisition module 202 may acquire the training data, test data, and input data from any source, such as from a user of the compute device 100, from the data storage 108, from another compute device, from a peripheral device 110 of the compute device 100, etc. In some embodiments, the test data may be acquired by randomly sampling and removing data samples from the training data.

The feature extraction module 204 is configured to extract features from data samples. In the illustrative embodiment, the data samples may be very high dimensional, such as the data from a high-resolution picture. In such cases, the feature extraction module 204 may transform the data samples into a reduced set of features. The feature extraction module 204 may use any algorithm for extracting features, including both hand-designed algorithms and automatic algorithms such as an autoencoder. Dimensionality reduction algorithms, such as principal component analysis, can also be incorporated in the feature extraction module 204. The feature extraction module 204 may be trained on training data, or may not require any training. In some embodiments, the data samples may not require feature extraction, and the feature extraction module 204 may not be used or may not be present in the environment 200. It should be appreciated that, throughout the present specification, when referring to classifying data samples, the classification may be done with either the raw data samples or with the features extracted based on the data samples, unless explicitly stated otherwise. In the illustrative embodiment, the feature extraction module 204 extracts the same features for use with the minority classification algorithm as for the primary classification algorithm. In other embodiments, the feature extraction module 204 may extract different features for use with the minority classification algorithm as for the primary classification algorithm.

The primary classification module 206 is configured to perform a primary classification on input data samples. In the illustrative embodiment, the algorithm used for the primary classification may be embodied as any classification algorithm other than one that is particularly directed to identifying members of a minority class, such as a random forest algorithm, support vector machines, etc. In other embodiments, the algorithm used for the primary classification may be embodied as any classification algorithm, including one that is particularly directed to identifying members of a minority class.

The primary classification module 206 includes a primary classification training module 210, which is configured to train the primary classification algorithm. The primary classification training module 210 may train the primary classification algorithm in a manner best suited to the particular classification algorithm chosen, such as by using labeled training data and test data, using unlabeled training data, etc.

The minority classification module 208 is configured to perform a minority classification algorithm on input data samples. Minority and majority classes are defined based on how big each class is compared to other classes. As used throughout this specification, unless explicitly stated otherwise, a minority class is defined as a class that has no more than one data sample in the training data for every two data samples in the largest majority class of the training data, and a majority class is defined as any class that is not a minority class. Of course, in some embodiments, a minority class may have a different relative number of data samples as compared to the largest majority class, such as no more than one data sample for every three, five, 10, 20, 50, 100, 200, 500, or 1000 data samples of the largest majority class. In some cases, a minority class may be defined in a different manner, such as being a certain amount smaller than the next largest class or based on clustering of class sizes. In some embodiments, determining the definition of a minority class may even be determined automatically through pattern recognition. There may be any number of majority and/or minority classes in any given training data set, such as more than or equal to one, two, five, 10, 20, 50, or 100 or any combination thereof.

The minority classification algorithm is configured to traverse a decision tree structure, and to determine at each node which child node an input data sample should be classified into. If the node the input data sample is classified into contains both minority classes and majority classes, the classification continues. If the node the input data sample is classified into contains only majority classes, the classification ends. In the illustrative embodiment, if the input data sample is classified into a node with more than one minority class (and no majority classes), the classification continues. In other embodiments, the classification may be considered complete even if there is more than one minority class (and no majority classes) in the node, and the input data sample may then be determined to be in one of the minority classes, but not necessarily classified into any particular minority class. Of course, if the input data sample is classified into a node with only a single class, the classification ends.

The minority classification module 208 includes a minority classification training module 212, which is configured to train the guided hierarchical classification algorithm used for minority classification based on training data. At the beginning of training, the decision tree structure of the guided hierarchical classification algorithm has a single starting node which includes all of the classes of the training data samples of the training data. The minority classification training module 212 includes a class distribution module 214, which determines how to distribute the classes present in the starting node into two or more child nodes. The illustrative class distribution module 214 distributes the classes so that each of the child nodes has approximately the same number of training data samples. Additionally or alternatively, the class distribution module 214 may isolate the largest class in its own separate child node. In some embodiments, the class distribution module 214 may distribute the classes into exactly two child nodes. In other embodiments, the class distribution module 214 may distribute the classes into a larger number of child nodes. The class distribution module 214 may, in some cases, distribute the classes to the child nodes based on anticipated or past performance of classifying the set of classes in the current node. In some embodiments, the class distribution module 214 may assign a class including all data samples of previously-misclassified classes to a separate child node.

The minority classification training module 212 also includes a classification algorithm selection module 216, which is configured to select a classification algorithm to be used to classify the training data samples from one node into the corresponding child nodes. It should be appreciated that a different classification algorithm may be chosen for each node. The classification algorithm selected may be embodied as any classification algorithm, such as a support vector machine, an artificial neural network, a random forest, etc. In the illustrative embodiment, a supervised classification algorithm is chosen, but in other embodiments an unsupervised classification algorithm may be used. The algorithm chosen may be based on any of a number of factors, such as how many child nodes are present, how much training data is available, past performance of one or more of the algorithms, and which algorithms have previously been tried.

The minority classification training module 212 is configured to train the classification algorithm selected by the classification algorithm selection module 216, and then a classification performance determination module 218 may determine the performance of the classification algorithm. In the illustrative embodiment, the performance of the classification algorithm is determined using test data, which is data similar to the training data but not used for the training data, in order to guard against overfitting. In some embodiments, the test data may be randomly sampled and removed from the training data prior to training of the classification algorithm In other embodiments, all of the available data may be used for training, and separate test data may not be used. The classification performance determination module 218 may determine the performance based on any metric, such as information gain, variance reduction, F-measure, generalization error, etc. In the illustrative embodiment, the performance is determined based on the F-measure of the classification of the minority class (or classes). The F-measure is defined as $(1+\beta^2)*R*P/(\beta^2*R+P)$, where R is the recall, P is the precision, and $\beta$ is a scaling factor between zero and infinity. The recall is defined as (true positive)/(true positive+false negative), and the precision is defined as (true positive)/(true positive+false positive). The scaling factor $\beta$ can be thought of as how many times more important the precision is compared to the recall. For detecting minority events, the recall is considered more important than the precision, so, in the illustrative embodiment, the scaling factor $\beta$ is less than one, such as less than 0.8, 0.6, 0.5, 0.3, or 0.1. The minority classification training module 212 may select or change the classification algorithm or the parameters thereof based on the performance determined by the classification performance determination module 218.

In some embodiments, the compute device 100 includes an action module 220. The action module 220 is configured to perform an action based on the classification of the input data sample, such as by providing an indication to a user of the compute device 100 of the classification.

Figure 3:
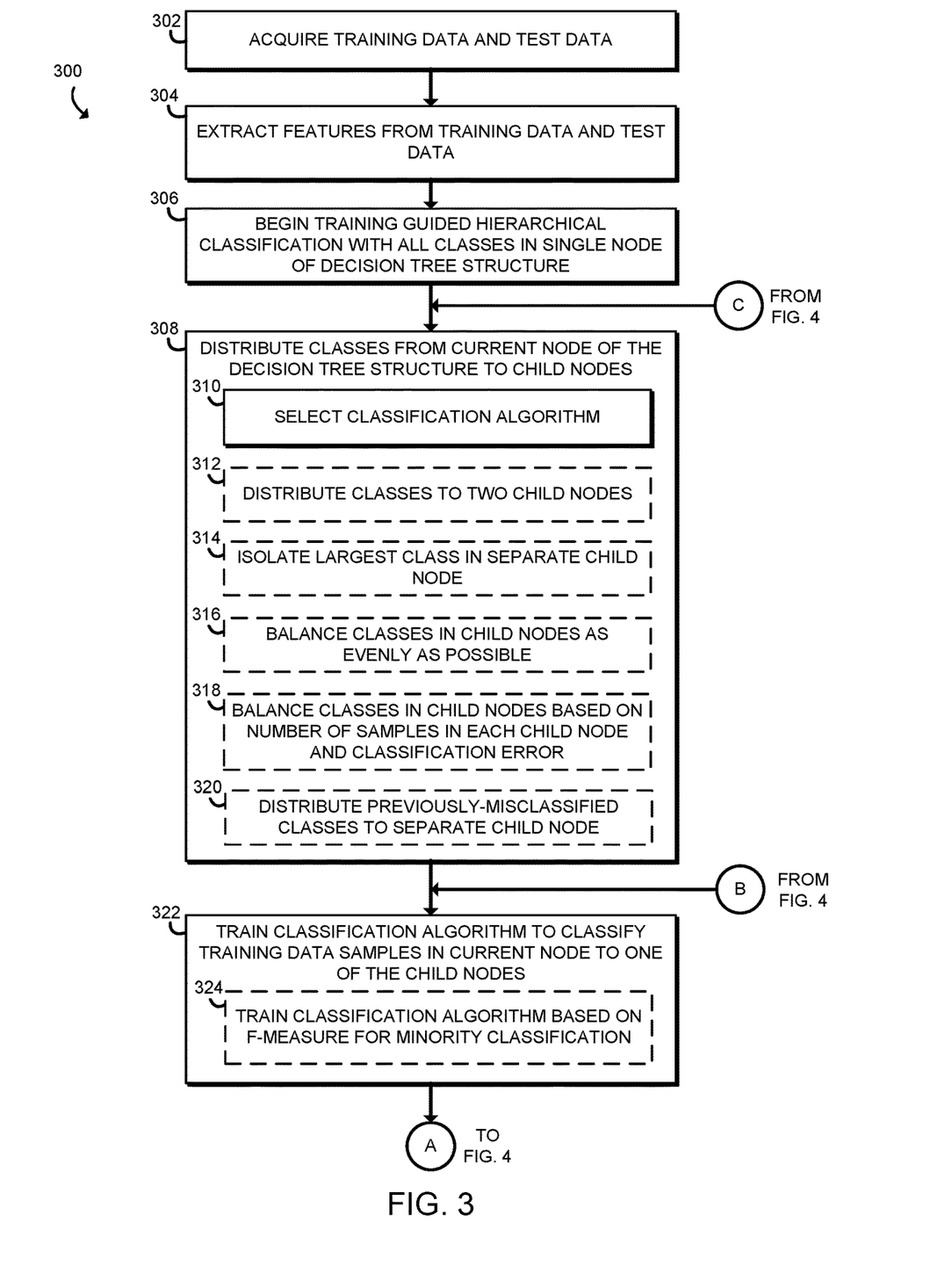
FIGS. 3 & 4 are a simplified flow diagram of at least one embodiment of a method for training a classification algorithm that may be executed by the compute device of FIG. 1.

Referring now to FIG. 3, a method 300 for training a classification algorithm may be executed by the compute device 100. The method begins in block 302, in which the compute device 100 may acquire training data and test data. In the illustrative embodiment, each of the training data and the test data includes labeled data samples, with the label indicating a class the corresponding data sample belongs to. In some embodiments, the training data and/or the test data may include unlabeled data samples, such as unlabeled data samples from one of the majority classes. The compute device 100 may acquire the training data and test data from any source, such as from a user of the compute device 100, from the data storage 108, from another compute device, from a peripheral device 110 of the compute device 100, etc. In some embodiments, the test data may be acquired by randomly sampling and removing data samples from the training data.

In block 304, the compute device 100 extracts features from the training data and the test data. The compute device 100 may employ any feature extraction algorithm and/or dimensionality reduction algorithms, such as principal component analysis, an autoencoder, scale invariant feature transform, etc. In some embodiments, the compute device 100 may not extract features from the training data and test data, and may use the training data samples and test data samples directly. In block 306, the compute device 100 begins training a guided hierarchical classification algorithm including a decision tree structure with all of the classes initially in a starting node of the decision tree structure.

In block 308, the compute device 100 distributes the classes present in the current node to child nodes. The compute device 100 may use any of a number of factors or combination of factors in determining how to distribute the classes, as described in blocks 312-320. In block 310, the compute device 100 selects a classification algorithm (and/or parameters of the classification algorithm) to use to classify the training data samples into the child nodes.

In block 312, the compute device 100 may distribute the classes in the current node to exactly two child nodes. In block 314, the compute device 100 may distribute the classes to isolate the largest class in a separate child node. In block 316, the compute device 100 may balance the classes in the child nodes as evenly as possible. In block 318, the compute device 100 may balance the classes in the child nodes based on the number of samples in each child node as well as anticipated or past classification error of such a distribution. In other words, the compute device 100 may allow a slightly or significantly imbalanced distribution of classes if it would improve or might improve the generalization error, such as by keeping the generalization error within tolerable limits. In block 320, the compute device 100 may distribute previously-misclassified classes to a separate child node. For example, if in the second (or later) iteration of distributing the classes from the current node to child nodes, there are training data samples present in the current node that do not belong to any of the classes of the current node, those data samples may be grouped into an error class and placed in their own child node. It should be appreciated that each of blocks 312-320 is optional, and the compute device 100 may execute any possible combination of those blocks as part of block 308.

In block 322, the compute device 100 trains the selected classification algorithm to classify the training data samples in the current node into one of the child nodes. In block 324, the compute device 100 may train the classification algorithm based on optimizing the F-measure for the classification of data samples belonging to a minority class. Of course, in some embodiments, the classification algorithm may use other metrics for feedback.

Figure 4:
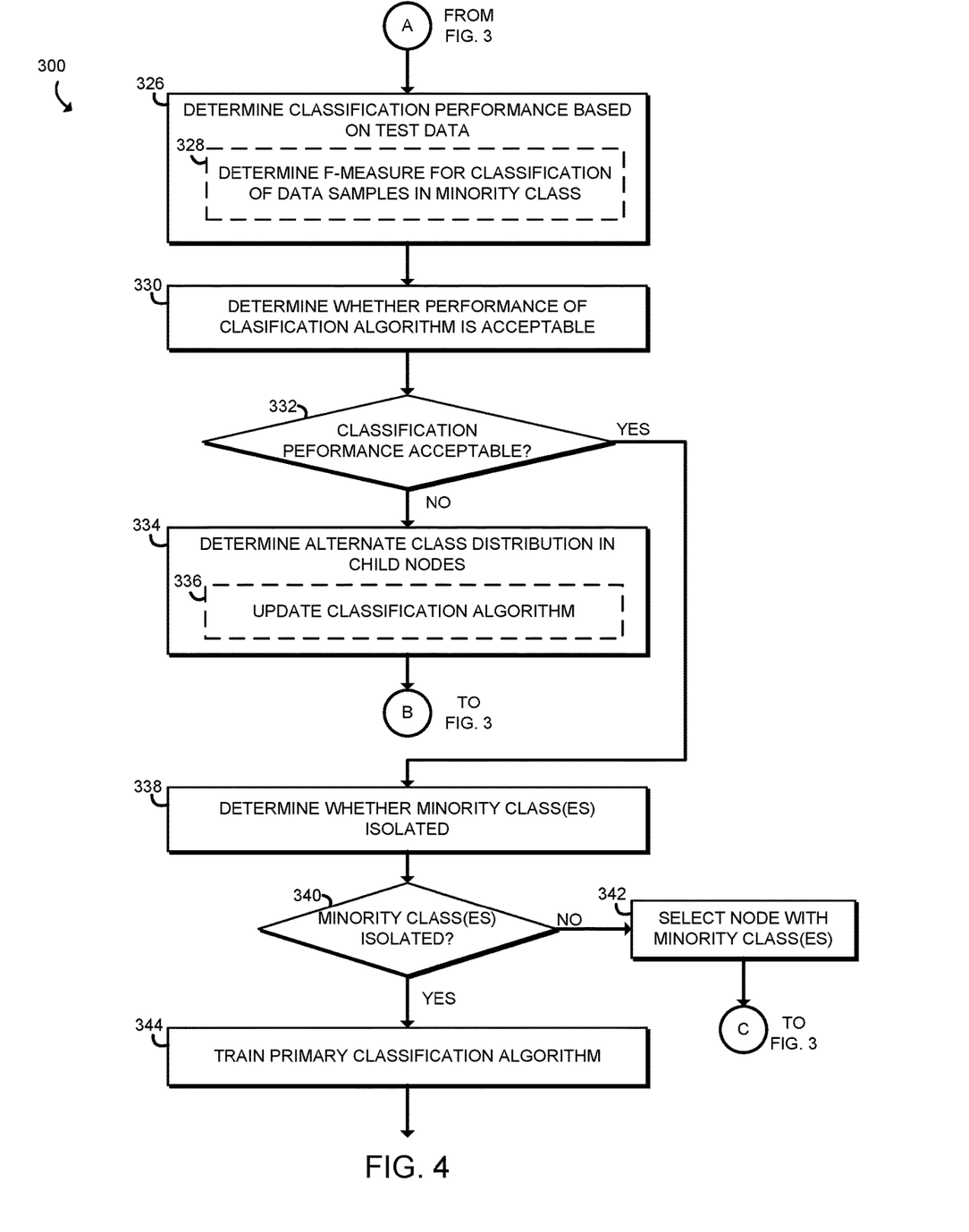

After the selected classification algorithm has been trained in block 322, the method 300 proceeds to block 326 of FIG. 4. In block 326, the compute device 100 determines a performance of the classification algorithm based on the test data. In the illustrative embodiment, the compute device 100 determines the F-measure of the classified minority data samples as classified into the child nodes in block 328. In block 330, the compute device 100 determines if the performance is acceptable. The compute device 100 may determine if the performance is acceptable based on several possible metrics or a combination of metrics, such as a value of the F-measure or other metric, the improvement from a previous iteration, the number of iterations, the generalization error, etc. It should be appreciated that, in some embodiments, the compute device 100 may determine that a previous classification algorithm and/or distribution of the child nodes is acceptable based on a later iteration, and may ultimately select a previous classification algorithm and/or distribution of the child nodes.

In block 332, if the performance of the classification algorithm is acceptable, the method 300 proceeds to block 334. In block 334, the compute device 100 determines an alternate class distribution in the child nodes. In doing so, the compute device 100 may consider any number of factors, such as those discussed above in blocks 312-320, which will not be repeated here for the sake of clarity. In some embodiments, the compute device 100 may update the classification algorithm used in block 336. It should be appreciated that, in some cases, the compute device 100 may update the classification algorithm without changing the distribution of child nodes in block 334.

Referring back to block 332, if the performance of the classification is acceptable, the method 300 proceeds to block 338, in which the compute device 100 determines whether the minority class is isolated (i.e., has no majority classes present in the same child node). If not, the child node with the minority class is selected and the method 300 loops back to block 308 in which the compute device 100 distributes classes with the child node as the new current node. In embodiments with more than one minority class, if more than one minority class is present in the node (with no majority classes present), the method 300 may proceed to either block 342 or 344, depending on the embodiment. In some cases, there may be more than one child node with a minority class present at block 342, and the method 300 may proceed back at block 308 for each of the child nodes.

If the minority class is isolated at block 340, the method proceeds to block 344, in which the compute device 100 trains the primary classification algorithm. As discussed above, the compute device 100 may train any classification algorithm in block 344 with any relevant technique.

Figure 5:
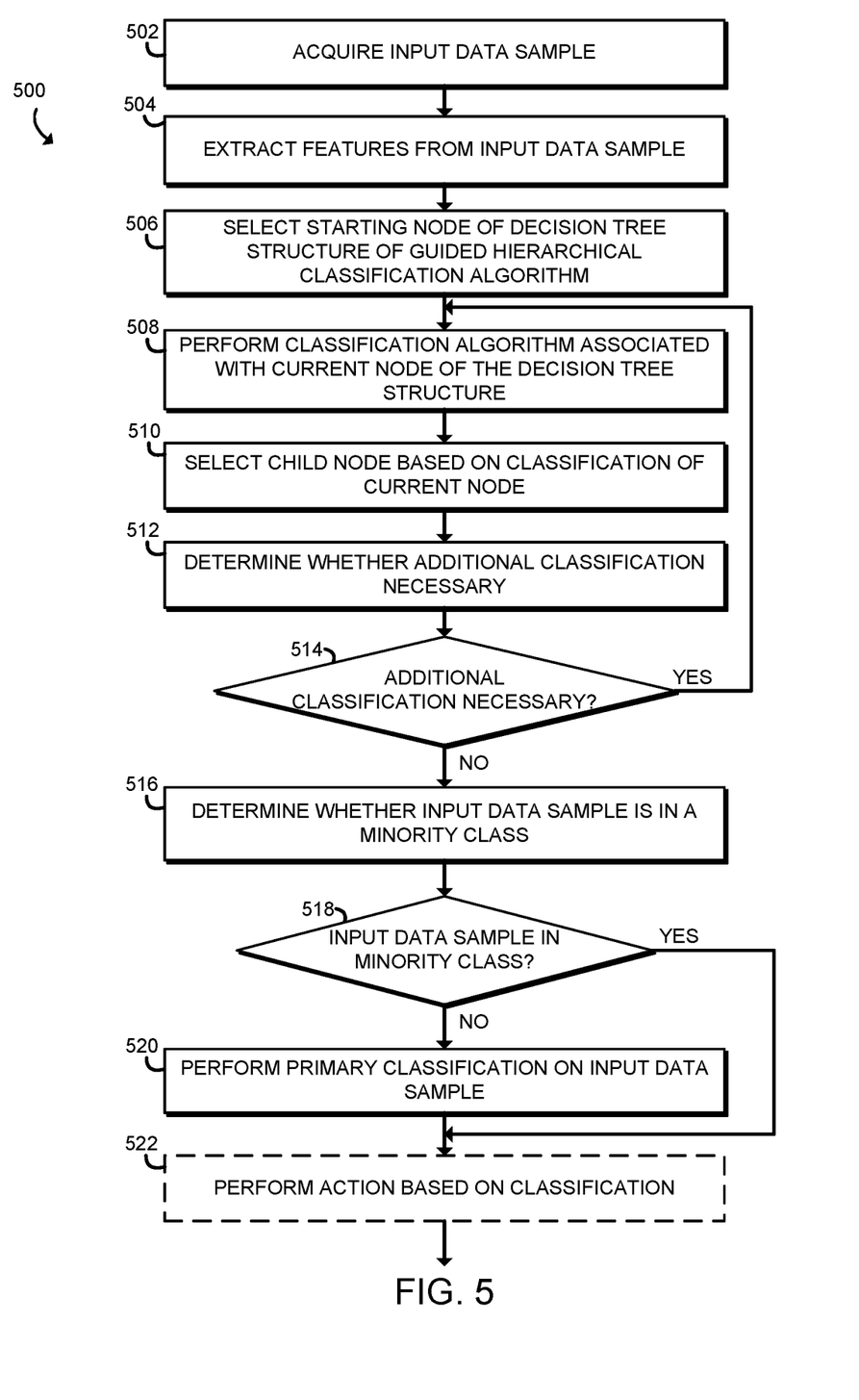
FIG. 5 is a simplified flow diagram of at least one embodiment of a method for performing a classification algorithm that may be executed by the compute device of FIG. 1.

Referring now to FIG. 5, in use, the compute device 100 may execute a method 500 for classifying an input data sample. The method begins in block 502, in which the compute device 100 acquires the input data sample. The compute device 100 may acquire the input data sample from any source, such as from a user of the compute device 100, from the data storage 108, from another compute device, from a peripheral device 110 of the compute device 100, etc.

In block 504, the compute device 100 extracts features from the input data sample. The compute device 100 may employ any feature extraction algorithm and/or dimensionality reduction algorithm, such as principal component analysis, an autoencoder, scale invariant feature transform, etc. In some embodiments, the compute device 100 may not extract features from the input data sample, and may use the input data sample directly. In block 506, the compute device 100 selects a starting node of a decision tree structure of the guided hierarchical classification algorithm of the compute device 100 for minority classification.

In block 508, the compute device 100 performs a classification algorithm associated with the current node of the decision tree structure, which classifies the input data sample into one of the child nodes of the current node. In block 510, the compute device 100 selects the child node that the input data sample is classified into.

In block 512, the compute device 100 determines if additional classification is necessary. If the current selected node is a leaf node (i.e., has no child nodes), then no further classification is necessary. If the current selected node is not a leaf node (i.e., has child nodes), then, in the illustrative embodiment, classification continues. This is because, in the illustrative embodiment, training the guided hierarchical classification algorithm is continued at each node until no further classification is necessary (i.e., the minority class has been isolated separately or as part of a group of minority classes). Of course, in some embodiments, additional child nodes may be available, but no further classification may be necessary, such as if the present node contains two or more majority classes and no minority classes. In some cases, classification will continue to be necessary until either no minority classes are in the present node or until only one class is in the present node.

In block 514, if additional classification is necessary, the method 500 loops back to block 508 in which the compute device 100 performs additional classification. If, however, no additional classification is needed, the method 500 proceeds to block 516. In block 516, the compute device 100 determines if the input data sample has been classified into a minority class. If, in block 518, the compute device determines that the data sample has been classified into a minority class, the method 100 advances to block 522 described below. If, however, the data sample has not been classified into a minority class, the method 100 advances to block 520. In block 520, the compute device 100 performs a primary classification on the input data sample, such as a random forest. Additionally, in some embodiments in block 522, in some embodiments, the compute device 100 performs an action based on the classification, such as by providing a notice to a user of the compute device 100 of the classification.

Figure 6A:
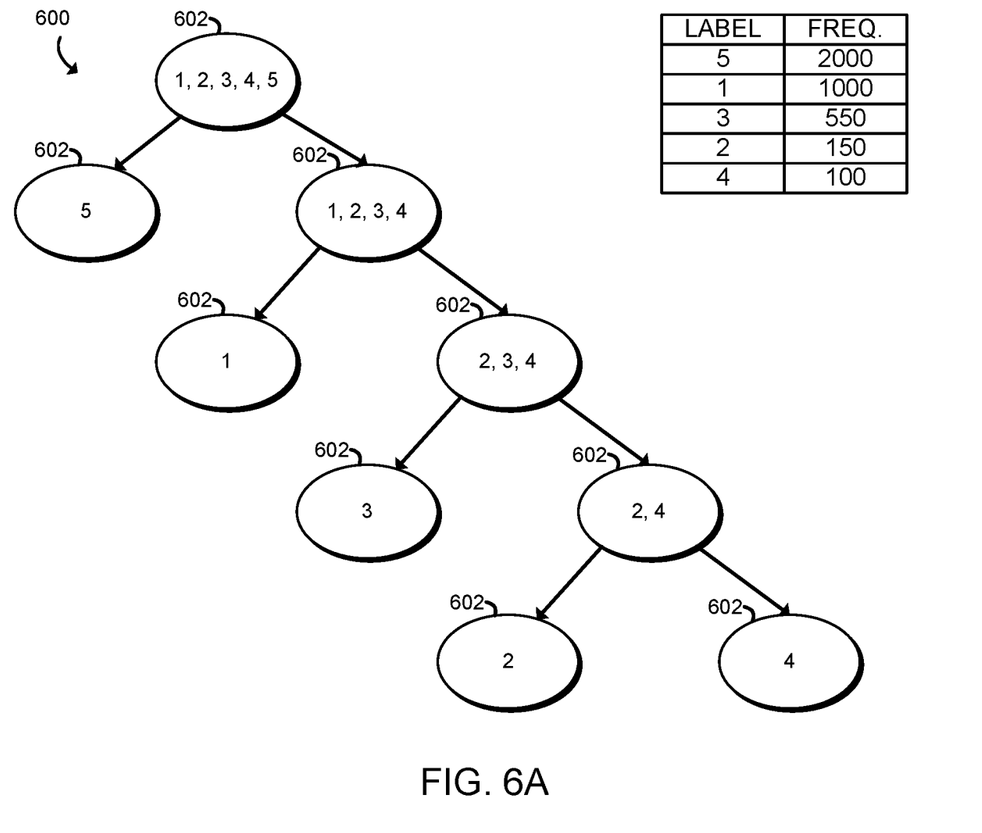
FIGS. 6A & 6B are simplified depictions of decision tree structures that may be generated as part of executing the method of FIGS. 3 & 4.

Referring now to FIG. 6A, an example of a decision tree structure 600 with several nodes 602 is shown. In the decision tree structure 600 in FIG. 6A, the largest class is isolated in separate child node at each level of the tree. The five classes are labeled 1, 2, 3, 4, and 5, with a relative frequency in the training data of 1000, 150, 550, 100, and 2000, respectively. In this example, classes 2 and 4 may be considered minority classes. The starting node 602 includes classes 1-5, and has two child nodes, one of which has class 5 and one of which has classes 1-4. The node 602 with classes 1-4 is further split into two child nodes 602, one which has class 1 and one which has classes 2-4. The node 602 with classes 2-4 is further split into two child nodes 602, one which has class 3 and one which has classes 2 and 4. The node 602 with classes 2 and 4 is further split into two child nodes 602, one which has class 2 and one which has class 4. It should be appreciated that, as the guided hierarchical classification algorithm is trained, a classification algorithm is trained to classify the classes present in each node of the decision tree structure to each of the corresponding child nodes.

Figure 6B:
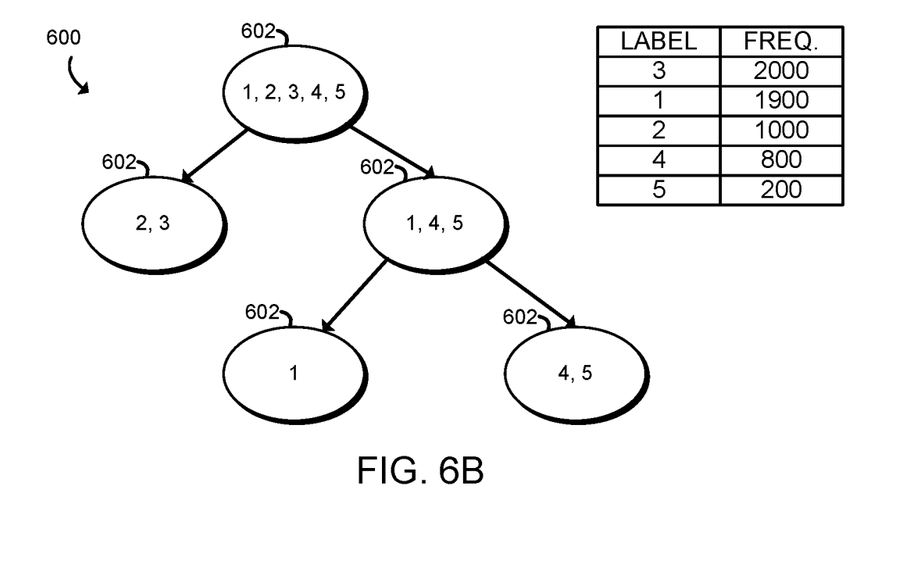

Referring now to FIG. 6B, another example of a decision tree structure 600 with several nodes 602 is shown. In the decision tree structure 600 in FIG. 6B, the classes are distributed from a parent node to two child nodes as evenly as possible. The five classes are labeled 1, 2, 3, 4, and 5, with a relative frequency in the training data of 1900, 1000, 2000, 800, and 200, respectively. In this example, classes 4 and 5 may be considered minority classes. The starting node 602 includes classes 1-5, and has two child nodes 602, one with classes 2 and 3 (for a total relative number of 3000 data samples) and one with classes 1, 4, and 5 (for a total relative number of 2900 data samples). The node 602 with classes 1, 4, and 5 may be further split into two nodes, one with class 1 and one with classes 4 and 5. In this embodiment, the classification of being in one of the minority classes 4 or 5 is sufficient, and further training of the decision tree structure 600 to separate class 4 from class 5 need not be done.

EXAMPLES

Illustrative examples of the devices, systems, and methods disclosed herein are provided below. An embodiment of the devices, systems, and methods may include any one or more, and any combination of, the examples described below.

Example 1 includes a compute device for classifying minority events, the compute comprising a data acquisition module to acquire training data comprising a plurality of training data samples, the plurality of training data samples comprising a plurality of labeled training data samples, each labeled training data sample belonging to a class of a plurality of classes, the plurality of classes comprising one or more minority classes and a plurality of majority classes; a minority classification module to train a guided hierarchical classification algorithm comprising a decision tree structure and a plurality of nodes of the decision tree structure, each node of the plurality of nodes comprising one or more classes of the plurality of classes, wherein at least two nodes of the plurality of nodes comprise at least one minority class of the one or more minority classes and at least one majority class of the plurality of majority classes, wherein to train the guided hierarchical classification algorithm comprises to distribute, for each of the at least two nodes, the classes in the corresponding node to two or more corresponding child nodes based on the number of training data samples in each of the classes in the corresponding node.

Example 2 includes the subject matter of Example 1, and further including a primary classification module to train a primary classification algorithm, wherein the data acquisition module is further to acquire an input data sample and the minority classification module is further to determine, based on the guided hierarchical classification algorithm, whether the input data sample is in the one or more minority classes.

Example 3 includes the subject matter of any of Examples 1 and 2, and further including an action module to perform an action in response to a determination that the input data sample is in the one or more minority classes.

Example 4 includes the subject matter of any of Examples 1-3, and wherein the data acquisition module is further to acquire a second input data sample, wherein the minority classification module is further to determine, based on the guided hierarchical classification algorithm, whether the second input data sample is in the one or more minority classes, and wherein the primary classification module is further to perform the primary classification algorithm on the second input data sample in response to a determination that the second input data sample is not in the one or more minority classes.

Example 5 includes the subject matter of any of Examples 1-4, and wherein to train the guided hierarchical classification algorithm further comprises to train, for each of the at least two nodes, a classification algorithm to classify each of the training data samples associated with the classes in the corresponding node into one of the two or more corresponding child nodes.

Example 6 includes the subject matter of any of Examples 1-5, and wherein the data acquisition module is further to acquire test data comprising a plurality of labeled test data samples, wherein to train, for each of the at least two nodes, the corresponding classification algorithm to classify each of the training data samples associated with the classes in the corresponding node comprises to determine, for each of the at least two nodes, a performance of the corresponding classification algorithm based on the plurality of labeled test data samples, wherein the plurality of labeled test data samples are not used to train the corresponding classification algorithm.

Example 7 includes the subject matter of any of Examples 1-6, and wherein to determine, for each of the at least two nodes, the performance of the corresponding classification algorithm comprises to determine, for each of the at least two nodes, the performance of the corresponding classification algorithm based on an F-measure of the classification of the training data samples corresponding to the at least one minority class.

Example 8 includes the subject matter of any of Examples 1-7, and wherein to determine, for each of the at least two nodes, the performance of the corresponding classification algorithm comprises to determine, for each of the at least two nodes, the performance of the corresponding classification algorithm based on a generalization error of the classification of the training data samples corresponding to the at least one minority class.

Example 9 includes the subject matter of any of Examples 1-8, and wherein to determine, for each of the at least two nodes, the performance of the corresponding classification algorithm comprises to determine, for each of the at least two nodes, the performance of the corresponding classification algorithm based on a combination of two or more metrics of the classification of the training data samples corresponding to the at least one minority class.

Example 10 includes the subject matter of any of Examples 1-9, and wherein to distribute, for each of the at least two nodes, the classes in the corresponding node to the two or more corresponding child nodes based on the number of training data samples in each of the classes in the corresponding node comprises to distribute, for each of the at least two nodes, the classes in the corresponding node to the two or more corresponding child nodes so that each of the two or more corresponding child nodes has as close to the same number of training data samples as possible.

Example 11 includes the subject matter of any of Examples 1-10, and wherein each of the at least one minority classes has no more than one training data sample for each fifty training data samples in the largest class of the plurality of classes.

Example 12 includes the subject matter of any of Examples 1-11, and wherein each of the at least one minority classes has no more than one training data sample for each one hundred training data samples in the largest class of the plurality of classes.

Example 13 includes the subject matter of any of Examples 1-12, and wherein each of the at least one minority classes has no more than one training data sample for each five hundred training data samples in the largest class of the plurality of classes.

Example 14 includes the subject matter of any of Examples 1-13, and wherein each of the at least one minority classes has no more than one training data sample for each one thousand training data samples in the largest class of the plurality of classes.

Example 15 includes the subject matter of any of Examples 1-14, and further including a feature extraction module to extract features from each of the plurality of training data samples, wherein to train the guided hierarchical classification algorithm comprises to train the guided hierarchical classification algorithm based on the features extracted from each of the plurality of training data samples.

Example 16 includes the subject matter of any of Examples 1-15, and wherein at least one of the at least two nodes of the plurality of nodes comprises an error child node, wherein the error child node comprises a class of the training data samples not in the classes corresponding to the at least one node of the at least two nodes.

Example 17 includes a method for classifying minority events with a compute device, the method comprising acquiring, by the compute device, training data comprising a plurality of training data samples, the plurality of training data samples comprising a plurality of labeled training data samples, each labeled training data sample belonging to a class of a plurality of classes, the plurality of classes comprising one or more minority classes and a plurality of majority classes; training, by the compute device, a guided hierarchical classification algorithm comprising a decision tree structure and a plurality of nodes of the decision tree structure, each node of the plurality of nodes comprising one or more classes of the plurality of classes, wherein at least two nodes of the plurality of nodes comprise at least one minority class of the one or more minority classes and at least one majority class of the plurality of majority classes, wherein training the guided hierarchical classification algorithm comprises distributing, for each of the at least two nodes, the classes in the corresponding node to two or more corresponding child nodes based on the number of training data samples in each of the classes in the corresponding node.

Example 18 includes the subject matter of Example 17, and further including training, by the compute device, a primary classification algorithm; acquiring, by the compute device, an input data sample; and determining, by the compute device and based on the guided hierarchical classification algorithm, whether the input data sample is in the one or more minority classes.

Example 19 includes the subject matter of any of Examples 17 and 18, and further including performing, by the compute device, an action in response to a determination that the input data sample is in the one or more minority classes.

Example 20 includes the subject matter of any of Examples 17-19, and further including acquiring, by the compute device, a second input data sample; determining, by the compute device and based on the guided hierarchical classification algorithm, whether the second input data sample is in the one or more minority classes; and performing, by the compute device, the primary classification algorithm on the second input data sample in response to a determination that the second input data sample is not in the one or more minority classes.

Example 21 includes the subject matter of any of Examples 17-20, and wherein training the guided hierarchical classification algorithm further comprises training, for each of the at least two nodes, a classification algorithm to classify each of the training data samples associated with the classes in the corresponding node into one of the two or more corresponding child nodes.

Example 22 includes the subject matter of any of Examples 17-21, and further including acquiring test data comprising a plurality of labeled test data samples, wherein training, for each of the at least two nodes, the corresponding classification algorithm to classify each of the training data samples associated with the classes in the corresponding node comprises determining, for each of the at least two nodes, a performance of the corresponding classification algorithm based on the plurality of labeled test data samples, wherein the plurality of labeled test data samples are not used to train the corresponding classification algorithm.

Example 23 includes the subject matter of any of Examples 17-22, and wherein determining, for each of the at least two nodes, the performance of the corresponding classification algorithm comprises determining, for each of the at least two nodes, the performance of the corresponding classification algorithm based on an F-measure of the classification of the training data samples corresponding to the at least one minority class.

Example 24 includes the subject matter of any of Examples 17-23, and wherein determining, for each of the at least two nodes, the performance of the corresponding classification algorithm comprises determining, for each of the at least two nodes, the performance of the corresponding classification algorithm based on a generalization error of the classification of the training data samples corresponding to the at least one minority class.

Example 25 includes the subject matter of any of Examples 17-24, and wherein determining, for each of the at least two nodes, the performance of the corresponding classification algorithm comprises determining, for each of the at least two nodes, the performance of the corresponding classification algorithm based on a combination of two or more metrics of the classification of the training data samples corresponding to the at least one minority class.

Example 26 includes the subject matter of any of Examples 17-25, and wherein distributing, for each of the at least two nodes, the classes in the corresponding node to the two or more corresponding child nodes based on the number of training data samples in each of the classes in the corresponding node comprises distributing, for each of the at least two nodes, the classes in the corresponding node to the two or more corresponding child nodes so that each of the two or more corresponding child nodes has as close to the same number of training data samples as possible.

Example 27 includes the subject matter of any of Examples 17-26, and wherein each of the at least one minority classes has no more than one training data sample for each fifty training data samples in the largest class of the plurality of classes.

Example 28 includes the subject matter of any of Examples 17-27, and wherein each of the at least one minority classes has no more than one training data sample for each one hundred training data samples in the largest class of the plurality of classes.

Example 29 includes the subject matter of any of Examples 17-28, and wherein each of the at least one minority classes has no more than one training data sample for each five hundred training data samples in the largest class of the plurality of classes.

Example 30 includes the subject matter of any of Examples 17-29, and wherein each of the at least one minority classes has no more than one training data sample for each one thousand training data samples in the largest class of the plurality of classes.

Example 31 includes the subject matter of any of Examples 17-30, and further including extracting, by the compute device, features from each of the plurality of training data samples, wherein training the guided hierarchical classification algorithm comprises training the guided hierarchical classification algorithm based on the features extracted from each of the plurality of training data samples.

Example 32 includes the subject matter of any of Examples 17-31, and wherein at least one of the at least two nodes of the plurality of nodes comprises an error child node, wherein the error child node comprises a class of the training data samples not in the classes corresponding to the at least one node of the at least two nodes.

Example 33 includes one or more computer readable media comprising a plurality of instructions stored thereon that, when executed, cause a compute device to perform the method of any of examples 17-32.

Example 34 includes a compute device for classifying minority events, the compute comprising means for acquiring training data comprising a plurality of training data samples, the plurality of training data samples comprising a plurality of labeled training data samples, each labeled training data sample belonging to a class of a plurality of classes, the plurality of classes comprising one or more minority classes and a plurality of majority classes; means for training a guided hierarchical classification algorithm comprising a decision tree structure and a plurality of nodes of the decision tree structure, each node of the plurality of nodes comprising one or more classes of the plurality of classes, wherein at least two nodes of the plurality of nodes comprise at least one minority class of the one or more minority classes and at least one majority class of the plurality of majority classes, wherein the means for training the guided hierarchical classification algorithm comprises means for distributing, for each of the at least two nodes, the classes in the corresponding node to two or more corresponding child nodes based on the number of training data samples in each of the classes in the corresponding node.

Example 35 includes the subject matter of Example 34, and further including means for training a primary classification algorithm; means for acquiring an input data sample; and means for determining, based on the guided hierarchical classification algorithm, whether the input data sample is in the one or more minority classes.

Example 36 includes the subject matter of any of Examples 34 and 35, and further including means for performing an action in response to a determination that the input data sample is in the one or more minority classes.

Example 37 includes the subject matter of any of Examples 34-36, and further including means for acquiring a second input data sample; means for determining, based on the guided hierarchical classification algorithm, whether the second input data sample is in the one or more minority classes; and means for performing the primary classification algorithm on the second input data sample in response to a determination that the second input data sample is not in the one or more minority classes.

Example 38 includes the subject matter of any of Examples 34-37, and wherein the means for training the guided hierarchical classification algorithm further comprises means for training, for each of the at least two nodes, a classification algorithm to classify each of the training data samples associated with the classes in the corresponding node into one of the two or more corresponding child nodes.

Example 39 includes the subject matter of any of Examples 34-38, and further including means for acquiring test data comprising a plurality of labeled test data samples, wherein the means for training, for each of the at least two nodes, the corresponding classification algorithm to classify each of the training data samples associated with the classes in the corresponding node comprises means for determining, for each of the at least two nodes, a performance of the corresponding classification algorithm based on the plurality of labeled test data samples, wherein the plurality of labeled test data samples are not used to train the corresponding classification algorithm.

Example 40 includes the subject matter of any of Examples 34-39, and wherein the means for determining, for each of the at least two nodes, the performance of the corresponding classification algorithm comprises means for determining, for each of the at least two nodes, the performance of the corresponding classification algorithm based on an F-measure of the classification of the training data samples corresponding to the at least one minority class.

Example 41 includes the subject matter of any of Examples 34-40, and wherein the means for determining, for each of the at least two nodes, the performance of the corresponding classification algorithm comprises means for determining, for each of the at least two nodes, the performance of the corresponding classification algorithm based on a generalization error of the classification of the training data samples corresponding to the at least one minority class.

Example 42 includes the subject matter of any of Examples 34-41, and wherein the means for determining, for each of the at least two nodes, the performance of the corresponding classification algorithm comprises means for determining, for each of the at least two nodes, the performance of the corresponding classification algorithm based on a combination of two or more metrics of the classification of the training data samples corresponding to the at least one minority class.

Example 43 includes the subject matter of any of Examples 34-42, and wherein the means for distributing, for each of the at least two nodes, the classes in the corresponding node to the two or more corresponding child nodes based on the number of training data samples in each of the classes in the corresponding node comprises means for distributing, for each of the at least two nodes, the classes in the corresponding node to the two or more corresponding child nodes so that each of the two or more corresponding child nodes has as close to the same number of training data samples as possible.

Example 44 includes the subject matter of any of Examples 34-43, and wherein each of the at least one minority classes has no more than one training data sample for each fifty training data samples in the largest class of the plurality of classes.

Example 45 includes the subject matter of any of Examples 34-44, and wherein each of the at least one minority classes has no more than one training data sample for each one hundred training data samples in the largest class of the plurality of classes.

Example 46 includes the subject matter of any of Examples 34-45, and wherein each of the at least one minority classes has no more than one training data sample for each five hundred training data samples in the largest class of the plurality of classes.

Example 47 includes the subject matter of any of Examples 34-46, and wherein each of the at least one minority classes has no more than one training data sample for each one thousand training data samples in the largest class of the plurality of classes.

Example 48 includes the subject matter of any of Examples 34-47, and further including means for extracting features from each of the plurality of training data samples, wherein the means for training the guided hierarchical classification algorithm comprises means for training the guided hierarchical classification algorithm based on the features extracted from each of the plurality of training data samples.

Example 49 includes the subject matter of any of Examples 34-48, and wherein at least one of the at least two nodes of the plurality of nodes comprises an error child node, wherein the error child node comprises a class of the training data samples not in the classes corresponding to the at least one node of the at least two nodes.

The invention claimed is:

1. A compute device for classifying minority events, the compute device comprising:
   a data acquisition module to acquire training data comprising a plurality of training data samples, the plurality of training data samples comprising a plurality of labeled training data samples, each labeled training data sample belonging to a class of a plurality of classes, the plurality of classes comprising one or more minority classes and a plurality of majority classes;
   a minority classification module to:
   train a guided hierarchical classification algorithm comprising a decision tree structure and a plurality of nodes of the decision tree structure, each node of the plurality of nodes comprising one or more classes of the plurality of classes, wherein at least two nodes of the plurality of nodes comprise at least one minority class of the one or more minority classes and at least one majority class of the plurality of majority classes,
   wherein to train the guided hierarchical classification algorithm comprises to distribute, for each of the at least two nodes, the classes in the corresponding node to two or more corresponding child nodes based on the number of training data samples in each of the classes in the corresponding node; and
   a primary classification module to train a primary classification algorithm, wherein the data acquisition module is further to acquire an input data sample and the minority classification module is further to determine, based on the guided hierarchical classification algorithm, whether the input data sample is in the one or more minority classes.

2. The compute device of claim 1, further comprising an action module to perform an action in response to a determination that the input data sample is in the one or more minority classes.

3. The compute device of claim 2, wherein the data acquisition module is further to acquire a second input data sample,
   wherein the minority classification module is further to determine, based on the guided hierarchical classification algorithm, whether the second input data sample is in the one or more minority classes, and
   wherein the primary classification module is further to perform the primary classification algorithm on the second input data sample in response to a determination that the second input data sample is not in the one or more minority classes.

4. The compute device of claim 1, wherein to train the guided hierarchical classification algorithm further comprises to train, for each of the at least two nodes, a classification algorithm to classify each of the training data samples associated with the classes in the corresponding node into one of the two or more corresponding child nodes.

5. The compute device of claim 4, wherein the data acquisition module is further to acquire test data comprising a plurality of labeled test data samples, wherein to train, for each of the at least two nodes, the corresponding classification algorithm to classify each of the training data samples associated with the classes in the corresponding node comprises to determine, for each of the at least two nodes, a performance of the corresponding classification algorithm based on the plurality of labeled test data samples, wherein the plurality of labeled test data samples are not used to train the corresponding classification algorithm.

6. The compute device of claim 5, wherein to determine, for each of the at least two nodes, the performance of the corresponding classification algorithm comprises to determine, for each of the at least two nodes, the performance of the corresponding classification algorithm based on an F-measure of the classification of the training data samples corresponding to the at least one minority class.

7. The compute device of claim 1, wherein to distribute, for each of the at least two nodes, the classes in the corresponding node to the two or more corresponding child nodes based on the number of training data samples in each of the classes in the corresponding node comprises to distribute, for each of the at least two nodes, the classes in the corresponding node to the two or more corresponding child nodes so that each of the two or more corresponding child nodes has as close to the same number of training data samples as possible.

8. The compute device of claim 1, wherein each of the at least one minority classes has no more than one training data sample for each fifty training data samples in the largest class of the plurality of classes.

9. A method for classifying minority events with a compute device, the method comprising:
   acquiring, by the compute device, training data comprising a plurality of training data samples, the plurality of training data samples comprising a plurality of labeled training data samples, each labeled training data sample belonging to a class of a plurality of classes, the plurality of classes comprising one or more minority classes and a plurality of majority classes;
   training, by the compute device, a guided hierarchical classification algorithm comprising a decision tree structure and a plurality of nodes of the decision tree structure, each node of the plurality of nodes comprising one or more classes of the plurality of classes, wherein at least two nodes of the plurality of nodes comprise at least one minority class of the one or more minority classes and at least one majority class of the plurality of majority classes,
   wherein training the guided hierarchical classification algorithm comprises distributing, for each of the at least two nodes, the classes in the corresponding node to two or more corresponding child nodes based on the number of training data samples in each of the classes in the corresponding node;
   training, by the compute device, a primary classification algorithm;
   acquiring, by the compute device, an input data sample; and
   determining, by the compute device and based on the guided hierarchical classification algorithm, whether the input data sample is in the one or more minority classes.

10. The method of claim 9, further comprising performing, by the compute device, an action in response to a determination that the input data sample is in the one or more minority classes.

11. The method of claim 10, further comprising:
   acquiring, by the compute device, a second input data sample;
   determining, by the compute device and based on the guided hierarchical classification algorithm, whether the second input data sample is in the one or more minority classes; and
   performing, by the compute device, the primary classification algorithm on the second input data sample in response to a determination that the second input data sample is not in the one or more minority classes.

12. The method of claim 9, wherein training the guided hierarchical classification algorithm further comprises training, for each of the at least two nodes, a classification algorithm to classify each of the training data samples associated with the classes in the corresponding node into one of the two or more corresponding child nodes.

13. The method of claim 12, further comprising acquiring test data comprising a plurality of labeled test data samples, wherein training, for each of the at least two nodes, the corresponding classification algorithm to classify each of the training data samples associated with the classes in the corresponding node comprises determining, for each of the at least two nodes, a performance of the corresponding classification algorithm based on the plurality of labeled test data samples, wherein the plurality of labeled test data samples are not used to train the corresponding classification algorithm.

14. The method of claim 13, wherein determining, for each of the at least two nodes, the performance of the corresponding classification algorithm comprises determining, for each of the at least two nodes, the performance of the corresponding classification algorithm based on an F-measure of the classification of the training data samples corresponding to the at least one minority class.

15. The method of claim 9, wherein each of the at least one minority classes has no more than one training data sample for each fifty training data samples in the largest class of the plurality of classes.

16. One or more non-transitory computer readable media comprising a plurality of instructions stored thereon that, when executed, cause a compute device to:
   acquire training data comprising a plurality of training data samples, the plurality of training data samples comprising a plurality of labeled training data samples, each labeled training data sample belonging to a class of a plurality of classes, the plurality of classes comprising one or more minority classes and a plurality of majority classes;
   train a guided hierarchical classification algorithm comprising a decision tree structure and a plurality of nodes of the decision tree structure, each node of the plurality of nodes comprising one or more classes of the plurality of classes, wherein at least two nodes of the plurality of nodes comprise at least one minority class of the one or more minority classes and at least one majority class of the plurality of majority classes,
   wherein to train the guided hierarchical classification algorithm comprises to distribute, for each of the at least two nodes, the classes in the corresponding node to two or more corresponding child nodes based on the number of training data samples in each of the classes in the corresponding node;

train a primary classification algorithm;
acquire an input data sample; and
determine, based on the guided hierarchical classification algorithm, whether the input data sample is in the one or more minority classes.

17. The one or more non-transitory computer readable media of claim 16, wherein the plurality of instructions further cause the compute device to perform an action in response to a determination that the input data sample is in the one or more minority classes.

18. The one or more non-transitory computer readable media of claim 17, wherein the plurality of instructions further cause the compute device:
acquire a second input data sample;
determine, based on the guided hierarchical classification algorithm, whether the second input data sample is in the one or more minority classes; and
perform the primary classification algorithm on the second input data sample in response to a determination that the second input data sample is not in the one or more minority classes.

19. The one or more non-transitory computer readable media of claim 16, wherein to train the guided hierarchical classification algorithm further comprises to train, for each of the at least two nodes, a classification algorithm to classify each of the training data samples associated with the classes in the corresponding node into one of the two or more corresponding child nodes.

20. The one or more non-transitory computer readable media of claim 19, wherein the plurality of instructions further cause the compute device to acquire test data comprising a plurality of labeled test data samples, wherein to train, for each of the at least two nodes, the corresponding classification algorithm to classify each of the training data samples associated with the classes in the corresponding node comprises to determine, for each of the at least two nodes, a performance of the corresponding classification algorithm based on the plurality of labeled test data samples, wherein the plurality of labeled test data samples are not used to train the corresponding classification algorithm.

21. The one or more non-transitory computer readable media of claim 20, wherein to determine, for each of the at least two nodes, the performance of the corresponding classification algorithm comprises to determine, for each of the at least two nodes, the performance of the corresponding classification algorithm based on an F-measure of the classification of the training data samples corresponding to the at least one minority class.

22. The one or more non-transitory computer readable media of claim 16, wherein each of the at least one minority classes has no more than one training data sample for each fifty training data samples in the largest class of the plurality of classes.

* * * * *